May 29, 1951 F. G. CAMPBELL 2,554,894
WATER TOWER FORMING, FLEXIBLE HOSE SECTION
Filed Aug. 16, 1949 2 Sheets-Sheet 1
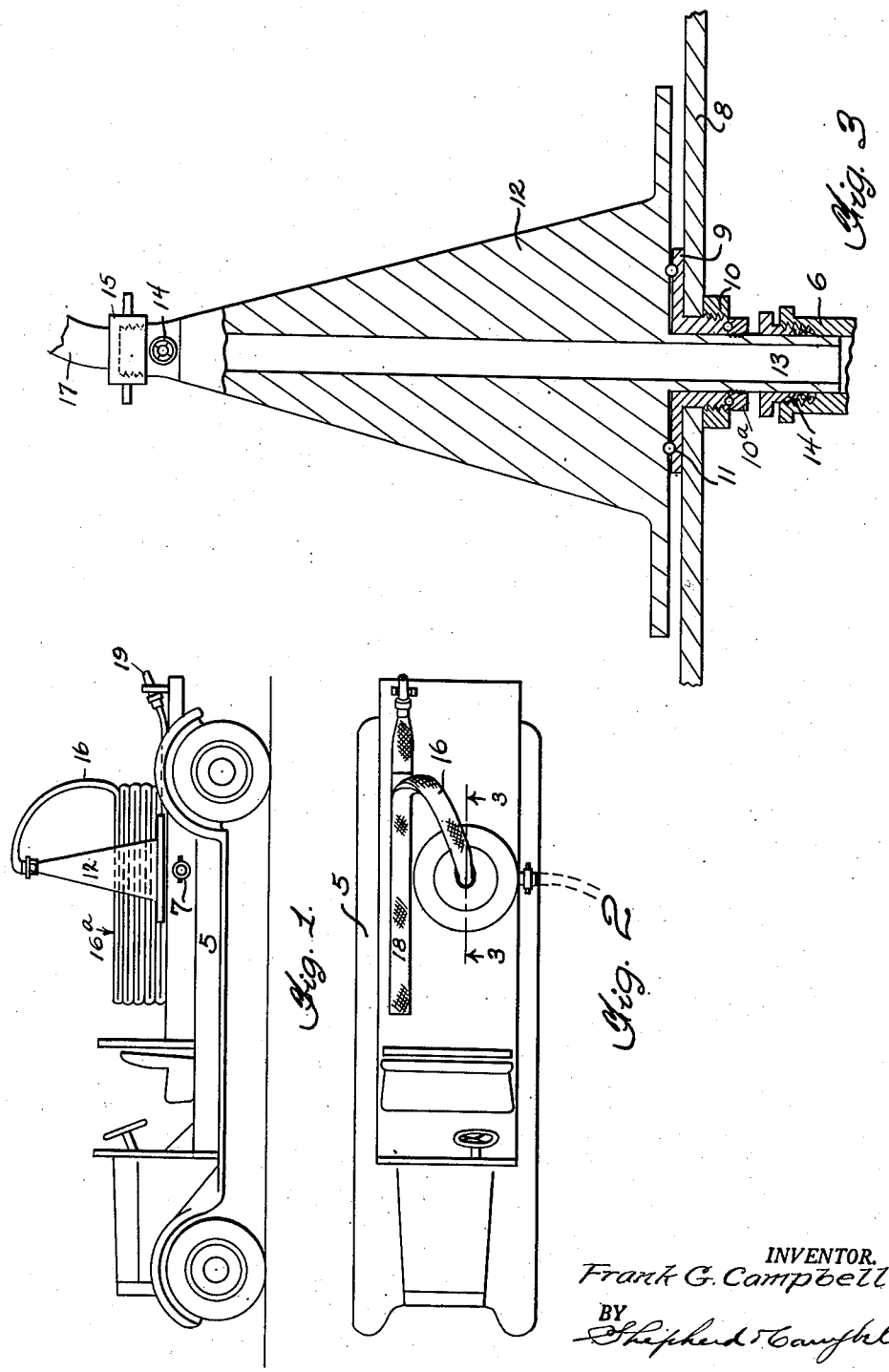
INVENTOR.
Frank G. Campbell
BY
Shepherd & Campbell

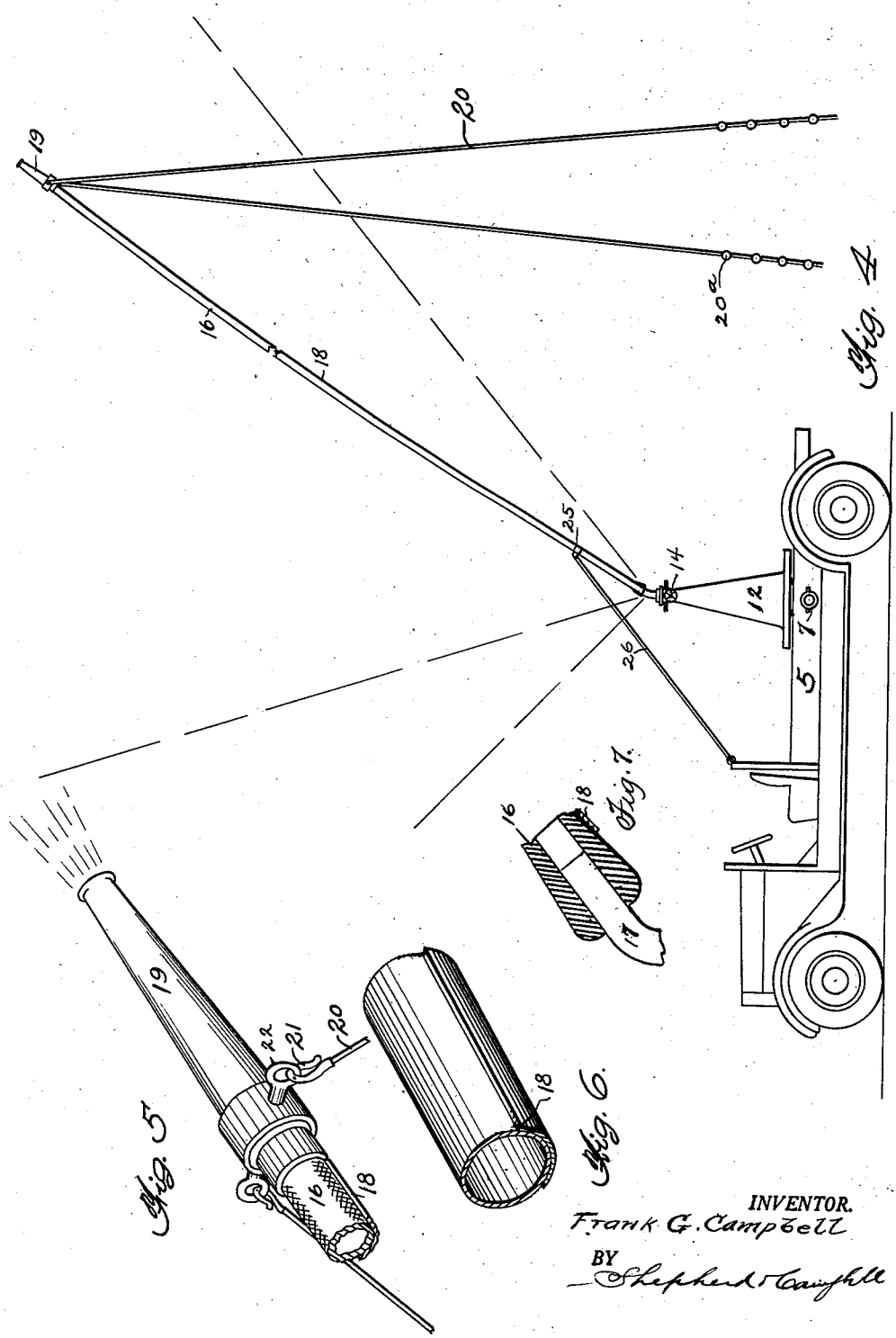

Patented May 29, 1951

2,554,894

UNITED STATES PATENT OFFICE 2,554,894

WATER TOWER FORMING, FLEXIBLE HOSE SECTION

Frank G. Campbell, Arlington, Va.

Application August 16, 1949, Serial No. 110,603

9 Claims. (Cl. 169—25)

This invention relates to a water tower of the type used by firemen for extinguishing fires and it consists of a length of hose adapted to be rolled or folded, to occupy but a small space, but capable of being extended into an elongated, rigid, upstanding water conducting member under the action of the water pressure therein, when such hose is connected for its supply to the high pressure discharge of a fire engine.

Further objects and advantages will be explained in conjunction with the description of the accompanying drawings, wherein:

Fig. 1 is a side elevation of a fire engine or hose cart;

Fig. 2 is a plan view of the same;

Fig. 3 is an enlarged sectional view through a rotative pedestal, hereinafter described;

Fig. 4 is a view like Fig. 1 with the device in action;

Fig. 5 is a perspective view of a hose nozzle and associated parts;

Fig. 6 is a fragmentary sectional view of the hose section which constitutes the principal feature of the invention; and Fig. 7 is a detail view of the lower portion of the hose.

In the drawings 5 designates a wheeled vehicle which may be a fire engine proper or it may be a hose cart. 6 designates the discharge for the water. If a fire engine, this element may receive the water of discharge from the engine (not shown) while if the vehicle is a hose cart, a supply hose from a separate engine may deliver water to discharge conduit 6 through a conventional coupling 7.

The vehicle 5 comprises a floor or platform 8, to which a raceway-forming plate 9 is bound by nut 10. Ball bearings 11 bear between plate 9 and a rotatable pedestal 12. A pipe-like extension 13 on the underside of the pedestal projects into the discharge conduit 6 and a conventional stuffing box 14 provides a fluid tight connection between 6 and 12 while permitting the pedestal to turn. A nut 10a prevents bodily lifting of the pedestal under water pressure.

The flow of water upwardly through pipe 13 may be controlled by a valve 14 located where shown, or in discharge conduit 6. The upper end of the pedestal is threaded, or otherwise formed, to receive a coupling 15 of a hose section 16. The lower end of the hose section may be formed with a rigid portion 17 which is bent from the vertical just enough to give an initial lateral deflection to the stream of water. The great majority of the length of the hose section 16 is of a more or less conventional form in that it is flexible enough to permit of its being rolled or folded into a relatively small compass as indicated at 16a in Fig. 1. However this hose section differs from a simple conventional hose in that it is provided along the length of its, preferably, lower side with a substantially non-extensible strip 18 such as stout canvas or leather, for example, of such nature that when water under high pressure is turned into the hose said hose will straighten out into a rigid rod-like member. By "substantially non-extensible strip" I mean a strip that is not extensible lengthwise to nearly as great a degree as the material of the body of the hose. The hose cannot assume a completely straight line because the non extensible strip 18 is made short enough to hold the hose in very slightly bowed form. Thus the action of the traveling water and the internal pressure built up in the hose as the water seeks to escape through the restricted nozzle 19 constantly causes the hose to attempt to assume a straight line. Thus the hose is held like a rod extending into the air and in the general direction of the rigid portion 17. To guide the stand pipe provided by this rigid rod like hose section and nozzle, light cables 20 are provided with snap hooks 21 for engagement with eyes 22 of the nozzle. Two firemen standing upon the ground may grasp knobs 20a or other handles, upon the cables and thus manipulate the nozzle. By reducing the water pressure by means of valve 14 or otherwise, the rigidity of the hose section may be controlled and may be so diminished that the firemen, by a short jerk upon the cables, may utilize the nozzle to break windows in the upper floors of a building, thus to permit the discharge of water through the nozzle, inwardly through the broken window.

When the device is to be used the vehicle 5 is stationed adjacent the burning building, the hose is stretched out to its full length along the street, the snap hooks are engaged in the eyes, two firemen hold the cables to prevent the hose from thrashing around and water is turned into the hose. As the hose tends to straighten out it rises in an attempt to align itself with the portion 17 and it may be assisted in its initial upward movement by the firemen with the cables or by other firemen with pike poles. When the pressure is turned on to a sufficient degree the tendency of the rushing column of water to travel in a straight line in conjunction with the tendency of the hose to itself straighten out will maintain the hose in substantially the position of Fig. 4. The capability of the pedestal to rotate permits the swinging of the hose and nozzles to varying positions around the pedestal axis.

I may, if desired, apply a collar to the hose at 25 and extend a stout strap or spring 26 between an eye 27 of the collar and an eye 28 on the frame of vehicle 5. This will aid in supporting the hose if such aid is deemed necessary, or when reduction of pressure to render the hose more limber, when smashing windows with the nozzle, makes such additional support desirable. However such support will not ordinarily be required.

By this invention every fire engine may constitute a water tower. This is of great value in suburban communities where water towers are not component parts of the usual volunteer fire departments, there found, and where the great majority of the houses are only two stories in height.

Since the usual height of rooms in small suburban homes does not exceed nine feet, it follows that since the pedestal may readily equal the distance from the ground to the first floor, then allowing 9 feet for the first floor, 8 feet, 6 inches for the second floor, 2½ feet for the distance from the second floor level to the third floor window sills and one foot for the joists between the floors, a hose of only a little more than 20 feet in length would be necessary to discharge water into the third floor windows. As above stated very few suburban homes are as much as three stories in height. With a two story house a hose of not more than fifteen feet in length would be ample. A hose as short as this with the non-extensible strip along one side and with a fire engine pressure of 150 pounds per square inch at the intake and a nozzle discharge pressure of 50 pounds per square inch would, it is thought, be wholly sufficient to render the hose self supporting. Any deflection or bending of the hose in any direction would have to be against the tendency of the strip 18 to assume the straightest possible position and the force of the water is tending to move this strip to that position.

Fig. 7 on enlarged scale shows how the lower end of the hose section 16 may be thickened to engage over rigid extension 17 to form a stout boot which resists too easy bending of 16 at its juncture with 17.

The invention is not limited to the precise construction set forth but includes within its purview whatever changes fairly come within either the terms or the spirit of the appended claims.

Having described my invention what I claim is:

1. A water tower element for fire fighting comprising a flexible hose adapted to be folded or rolled, a substantially non-extensible strand extending along one side thereof to limit the degree of straightening out of the hose under the action of water pressure therein, and means for securing the lower end of the hose to a source of water supply under pressure.

2. A water tower element for fire fighting comprising a flexible hose adapted to be folded or rolled, a substantially non-extensible strand extending along one side thereof to limit the degree of straightening out of the hose under the action of water pressure therein, means for securing the lower end of the hose to a source of water supply under pressure and a nozzle secured to the upper end of the hose.

3. A water tower element for fire fighting comprising a flexible hose adapted to be folded or rolled, a substantially non-extensible strand extending along one side thereof to limit the degree of straightening out of the hose under the action of water pressure therein, means for securing the lower end of the hose to a source of water supply under pressure and a nozzle secured to the upper end of the hose, and means for guiding and swinging said nozzle from position upon the ground.

4. A water tower element for fire fighting comprising a flexible hose adapted to be folded or rolled, a substantially non-extensible strand extending along one side thereof to limit the degree of straightening out of the hose under the action of water pressure therein, means for securing the lower end of the hose to a source of water supply under pressure and a nozzle secured to the upper end of the hose and cables for guiding and swinging said nozzle from position upon the ground.

5. A water conducting fire hose section formed of a material flexible enough to be rolled or folded, said hose having a substantially non-extensible member secured along one side thereof of a length to prevent the hose from assuming a completely straight line when water under pressure is introduced thereinto, and means for connecting one end of the hose to the water supply from a fire engine.

6. A water conducting fire hose section formed of a material flexible enough to be rolled or folded, said hose having a substantially non-extensible member secured along one side thereof of a length to prevent the hose from assuming a completely straight line when water under pressure is introduced thereinto, and means for connecting one end of the hose to the water supply from a fire engine, a nozzle connected to the other end of the hose formed of such material and of such weight as to adapt it to smash windows by the swinging of the hose and means accessible from the ground for swinging the said hose and nozzle.

7. A structure as recited in claim 6 wherein the means for swinging the hose and nozzle comprises cables attached to the opposite sides of the nozzle and extending to the ground.

8. A structure of the character described comprising a flexible hose section, a substantially non-extensible strip secured along one side of the hose section of a length to limit the straightening out of the hose section when pressure is turned thereinto, a rotative pedestal having a water conduit therethrough adapted to receive water from the discharge of a fire engine and means for connecting the lower end of said hose to the conduit of the pedestal.

9. A structure as recited in claim 8 wherein said connecting means comprises a rigid member shaped to connect the hose to the pedestal in such manner that the hose extends outwardly and upwardly from said pedestal.

FRANK G. CAMPBELL.

REFERENCES CITED

The following references are of record in the file of this patent:

UNITED STATES PATENTS

| Number | Name | Date |
| --- | --- | --- |
| 562,895 | Hayes | June 30, 1896 |
| 895,008 | German | Aug. 4, 1908 |
| 1,114,079 | Webster | Oct. 20, 1914 |
| 1,716,305 | Dillman | June 4, 1929 |